United States Patent [19]

Saito et al.

[11] Patent Number: 4,751,533

[45] Date of Patent: Jun. 14, 1988

[54] THERMAL-ELECTROSTATIC INK JET RECORDING APPARATUS

[75] Inventors: Koichi Saito; Yoshihiko Fujimura; Nanao Inoue, all of Kanagawa, Japan

[73] Assignee: Fuji Xerox Co., Ltd., Tokyo, Japan

[21] Appl. No.: 30,356

[22] Filed: Mar. 26, 1987

[30] Foreign Application Priority Data

Mar. 27, 1986 [JP] Japan ................................ 61-67310

[51] Int. Cl.[4] ............................................ G01D 15/16

[52] U.S. Cl. ................................ 346/140 R; 400/126; 346/75

[58] Field of Search ............. 346/1.1, 140 PD, 140 R, 346/153.1, 155, 159; 400/126

[56] References Cited

U.S. PATENT DOCUMENTS 3,790,703 2/1976 Carley ................................ 346/1.1

4,383,265 5/1983 Kohashi ...................... 346/140 PD 4,631,555 12/1986 Ikeda et al. ................. 346/140 PD

FOREIGN PATENT DOCUMENTS 0090775 5/1985 Japan ........................... 346/140 PD

*Primary Examiner*—H. Broome

*Assistant Examiner*—Huan H. Tran

*Attorney, Agent, or Firm*—Finnegan, Henderson, Farabow, Garrett and Dunner

[57] ABSTRACT

A non-impact image recording head wherein electric and thermal energies are applied to an ink to be jetted onto paper and at least one discharge opening, in a cover member, is spaced apart from the positioned opposite at least one heating element which is activated, in response to an image signal, to jet the ink onto the paper.

3 Claims, 6 Drawing Sheets

THERMAL-ELECTROSTATIC INK JET RECORDING APPARATUS

FIELD OF THE INVENTION

This invention relates to a non-impact image recording head for recording an image by jetting a liquid coloring agent such as ink at a recording member.

BACKGROUND OF THE INVENTION

The so-called ink jet or non-impact recording method is becoming popular as a method for converting image data in the form of electrical signals into hard copies because less noise is produced during recording than in impact recording. The ink jet method is also considered particularly useful because ordinary paper is usable without the need for a special process, such as fixing, for recording purposes.

An ink jet method that has already been put to practical use comprises the steps of filling an airtight container with ink, applying a pressure pulse thereto, and sending the ink out of the orifice of the container in a jet for recording purposes. Since the ink jet recorder for the aforesaid method cannot be made compact in view of its operating mechanism, the recorder requires scanning mechanically if recording has to be made with a desired image density. Consequently, the recording speed of this method has been unsatisfactory.

At the same time, there have been proposed techniques for remedying shortcomings inherent in the ink jet method and making high-speed recording possible. The magnetic ink jet method is a typical example of such improvement, which comprises arranging magnetic ink close to a magnetic electrode array, forming an ink-jet state corresponding in position to a picture element by making use of a swell of the ink in the presence of a magnetic field, and jetting out the magnetic ink in the static electric field. Since this method admits of electronic scanning, high-speed recording becomes possible but it is still disadvantageous in that only selected inks may be used and the coloration characteristic of the magnetic ink is often unacceptable.

Apart from the aforesaid methods, there is also well known the so-called plane ink jet method, which comprises arranging the ink in a slitlike inkholder in parallel to an electrode array, and jetting the ink in accordance with an electric field pattern formed between an electrode facing the electrode array through recording paper. Since no minute orifice for storing ink is required in this method, the problem of ink clogging is minimized. However, high voltage applied for jetting the ink makes it necessary to drive the electrode array on a time division basis to prevent a voltage leak across adjoining or neighboring electrodes. Again, this disadvantage limits the recording speed.

There has also been proposed the so-called heat bubble method for jetting ink out of an orifice by means of thermal energy. In this method, the ink is abruptly heated to cause film boiling. The pressure rise resulting from the rapid formation of bubbles within the orifice is utilized to jet the ink. However, the film boiling temperatures are as high as 500°-600° C. and this makes it difficult to put this method to practical use because the ink properties tend to change with increasing temperature and because a protective layer covering the heating resistor is deteriorated by the high temperatures.

As set forth above, there are many problems remaining to be solved in the ink jet methods heretofore developed. Such problems include difficulty in sufficiently increasing recording speed, the necessity of employing special ink and contriving a particular driving means, and possible thermal deterioration of the ink and the heating means.

OBJECT AND SUMMARY OF THE INVENTION

The present invention is intended to solve the above problems and it is therefore an object of the invention to provide an image recording head for recording images at high speed without difficulty in selecting the ink that can be used.

According to the present invention, there is provided an image recording head for forming the image wherein both electric and thermal energies are applied to a liquid coloring agent arranged therein to jet the liquid coloring agent located in the area to which both the energies have been applied, which comprises a liquid coloring agent discharge portion having one or more slits, thermal energy applying means opposite the discharge portion positioned a predetermined space apart, means for arranging the liquid coloring agent between the discharge portion and the thermal energy applying means, and electric energy applying means for applying the electric field to the liquid coloring agent. The present invention further contemplates applying both the electric and thermal energies to the liquid coloring agent and jetting out the agent located in the area to which both the energies have been applied.

A plurality of heating elements, for instance, are arranged in the form of an array and allowed to contact a liquid coloring agent. The heating element located in a position corresponding to a recording picture element is selectively heated in response to an image signal at the time that a uniform electric field is applied to the whole liquid coloring agent. Thus, the liquid coloring agent is caused to be jetted at a recording member. One picture element is recorded each time a droplet of the agent is jetted. By the repetition of the aforesaid process, a picture element train in the form of a line is recorded and, by scanning the recording member, an image can be recorded.

According to the present invention, a base is horizontally arranged in the image recording head and a cover having one or more slits is placed thereon. The liquid coloring agent is contained in a space provided between the cover and the heating resistors. When current is supplied to a heating resistor beneath a slit, the liquid coloring agent is discharged from the slit and caused to jet at a recording member. The liquid coloring agent is continuously supplied from the sides of the cover to the discharge portion.

The aforesaid operation is preferably implemented by the following method. An electric field is first uniformly applied to the whole liquid coloring agent. In this state, the agent is not yet sufficiently stimulated to be jetted. Then the thermal energy is locally applied to the agent, whereby the agent located in the area receiving the thermal energy is caused to jet out of the image recording head.

BRIEF DESCRIPTION OF THE DRAWINGS

The present invention will be fully understood by reference to the detailed description in view of the accompanying drawings wherein.

DETAILED DESCRIPTION

Figure 2A:
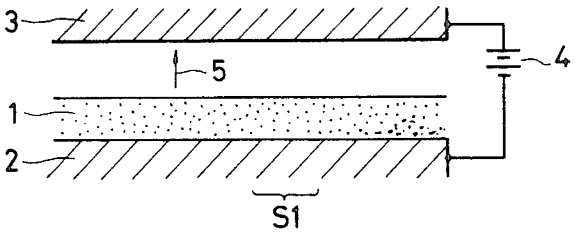
FIGS. 2(A)-2(C) are schematic diagrams illustrating the recording principle of the present invention.
Figure 2B:
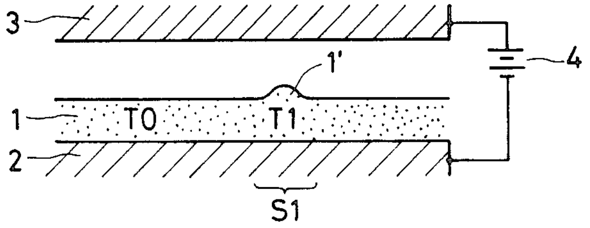
Figure 2C:
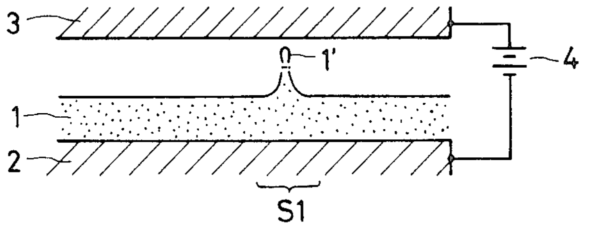

Referring now to FIGS. 2(A)-2(C), the principle of operation of the image recording head according to the present invention will be described.

As shown in FIG. 2(A), a liquid coloring agent 1 is contained between a base electrode 2 and an opposite electrode 3. As the liquid coloring agent 1 is ink (hereinafter referred to as simply the "ink 1") possessing the proper electrical resistance and being in a liquid state at operating temperature. The base electrode 2 and the opposite electrode 3 are both conductive plates.

A d.c. power supply 4 is used to apply voltage across the electrodes 2, 3. This generates a fixed static electric field that is applied to the ink 1 and, because of its static inductive action, the Coulomb force which is the sum of the inductive charge produced thereby and the static electric field acts on the free surface of the ink. Therefore, the ink 1 is urged to jet in a direction 5.

On the other hand, surface tension, interfacial tension, and viscosity resistance act as a drag on the ink and retard jetting. FIG. 2(A) shows the state in which the drag is greater than the Coulomb force and the level of the ink remains flat.

If the ink 1 is locally heated that is the temperature an area S1 in FIG. 2(B) is raised to T1 which is higher than the temperature T0 of the rest of the ink, the ink level in the area S1 will be caused to swell. This is because the higher ink temperature reduces drag in the area S1 and enables the action of the Coulomb force to increase locally. (See FIG. 2(B)). The electric field is concentrated in the ink 1' thus swollen and the action of the Coulomb force is further accelerated. Ultimately, part of the ink 1' in the area S1 grows in the form of a column as shown in FIG. 2(C) and is jetted as a droplet to the opposite electrode 3. This phenomenon can be brought about rapidly without sharply heating the ink as the surface thereof undergoes a phase change resulting from film boiling.

In other words, thermal as well as electric energies are applied by the electric field and heating of the ink. The applied quantities of the energies are selected to allow only the ink in the areas to which both the energies have been applied to jet out. The places at which the ink is caused to jet and jet timing are thereby controllable.

The aforesaid principle was proved through the following experiments. The ink 1 was arranged on the base electrode 2 as shown in FIG. 2(A) and, while the temperature thereof was kept constant, the voltage of the power supply 4 was gradually raised. When the voltage exceeded a certain level, an ink column 1', as shown in FIG. 2(C), began to grow randomly toward the opposite electode 3. This phenomenon is described as the growth of a unstable electrical fluid mechanical wave in "FIELD COUPLED SURFACE WAVES"; pp 61-66, J. R. Melcher (M. I. T. Press). The Coulomb force is locally concentrated by the perturbation (local uneveness in the deformation of the liquid level or electric field) naturally produced when the Coulomb force acting in the upward direction perpendicular to the ink exceeds the drag to allow the ink column to grow.

In the operation of the present invention, the electric field was selected to be insufficient to cause ink at room temperature to form columns. When the ink was heated in this state, the surface tension and viscosity of the ink located in the heated area were reduced. As a result, an unstable surface wave was produced and the electric field caused an ink column to grow. An ink droplet was jetted and was attracted to the surface of a recording member, such as recording paper, so that one ink dot could be recorded. An image was recordable by arranging the dots methodically.

Figure 1:
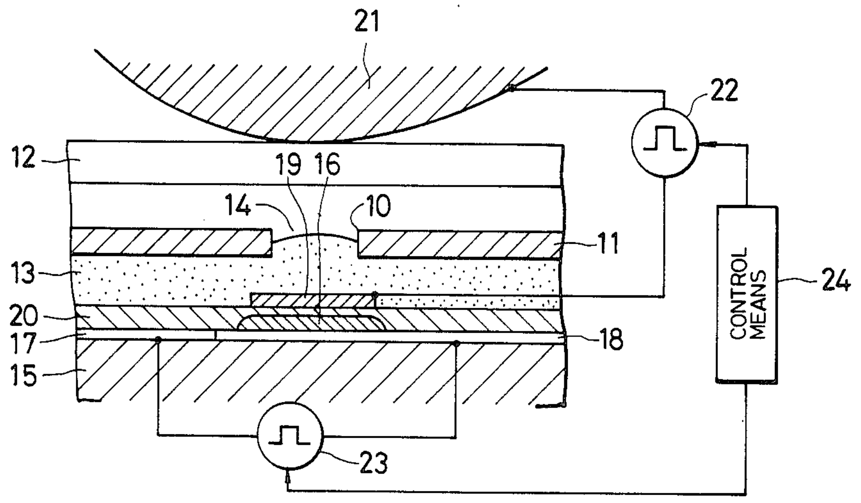
FIG. 1 is a vertical sectional view of an image recording head embodying the present invention.
Figure 3:
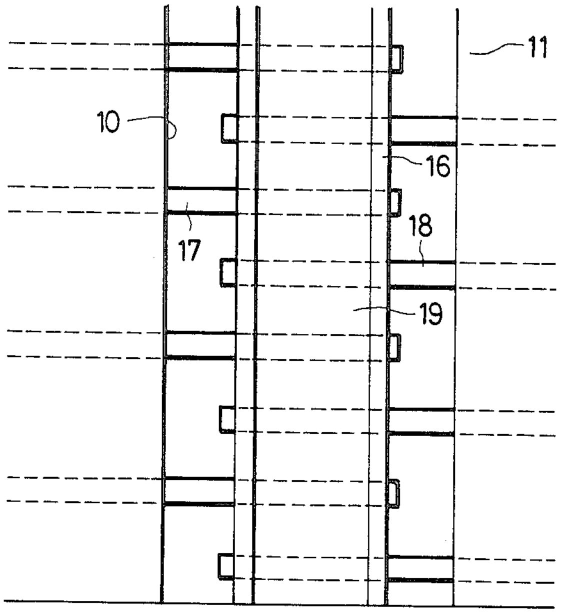
FIG. 3 is a top view of the principal portion of the embodiment of FIG. 1.

Referring to FIGS. 1 and 3, alternating lead electrodes 17, 18 were formed on a horizontally arranged base 15 and belt-like elongated heating resistors 16 were formed perpendicularly to the lead electrodes 17, 18. A heat resistant insulating layer 20 was provided to cover the surface of the aforesaid combination. The recording head thus constructed was quite similar to a thermal head for use in a conventional heat transfer type printer, with a recording picture element pitch of 8 dots/mm.

Moreover, an electric field forming electrode 19 composed of gold 1,000 Å thick and 150 μm wide was formed adjacent to the resistors 16 on the heat resistant insulating layer 20 by mask evaporation. Further, a cover 11 having a slit 10 was placed on the surface of the base 15. The slit 10 was aligned with, and centered over, the electric field forming electrode 19. The slit 10 was parallel to, and approximately as long as, the electric field forming electrode 19 and the heating resistor 16. The gap between the base 15 and the cover 11 was preferably approximately 10-200 μm. The liquid coloring agent 13 was contained in the gap and the slit 11 comprised a liquid coloring agent discharge portion 14.

Ordinary recording paper for use in a conventional copying machine was arranged as a recording member 12 above the base 15 and a backing or opposite electrode 21 was provided to support the paper. A power source 22 was connected between the opposite electrode 21 and the electric field forming electrode 19 to form an electric energy applying means.

The electrodes 17, 18 on both sides of the heating resistors 16 were connected to a power supply 23 to embody a thermal energy applying means.

Dye soluble oil ink was used which had the following properties at 20° C.: volume resistivity = $10^7\Omega\cdot$cm; viscosity = 30 cp; and surface tension = 37 dyne/cm. As the opposite electrode 21, moreover, a metal roll 4 mm in diameter was used, and the gap between the electric field forming electrode 19 and the opposite electrode was set at 300 μm.

The heating resistors 16 were energized in a time division manner as in the case of a conventional thermal head. In this embodiment, they were driven on a sexpartite basis and energized with 17 V for 2 msec per dot. Voltage at 2,000 V was applied, synchronously with the energization, across the opposite electrode 21 and the electric field forming electrode 19.

The power supplies 22, 23, caused to selectively produce an electric pulse in response to on the image signal of an image being recorded, were controlled by a control means 24. The control means 24 consisted of a shift register driver of the type known for driving a thermal head. Only droplets of ink from the heated areas jetted at the recording member 12, to form corresponding circular dots about 80 μm in diameter on the recording surface.

In the case of the aforesaid embodiment, the electric field forming electrode 19 was located immediately above the heating resistor 16 and was so arranged as not to face the left and right lead electrodes 17, 18. In this manner, current for driving the heating resistor 16 was prevented from increasing because of the capacitive coupling between the electric field forming electrode 19 and the lead electrodes 17, 18.

When the above operation was conducted while no voltage was applied across the electric field forming electrode 19 and the opposite electrode 21, the ink did not jet. When the voltage applied across the electric-field forming electrode 19 and the opposite electrode 21 was raised without supplying current to the heating resistor 16 to heat the ink, the ink 13 was seen to fly randomly throughout the discharge opening 14 voltage level exceeding 3,000 V.

Since according to the present invention, the ink is caused to jet by applying the electric and thermal energies there must exist threshold conditions or levels under which the ink will jet and these threshold values can be used to ensure stable ink jetting.

Figure 4A:
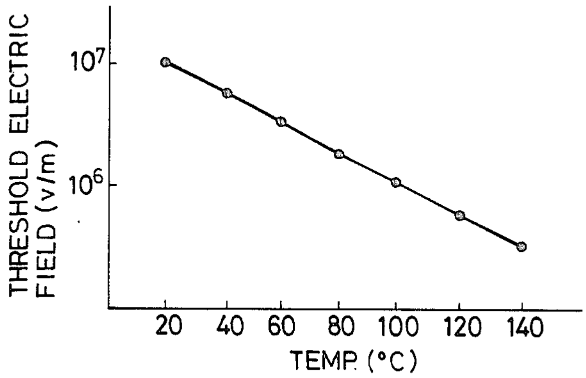
FIGS. 4(A) to 4(D) are graphs showing the dependance of the threshold value of an electric field on temperature and ink properties.
Figure 4B:
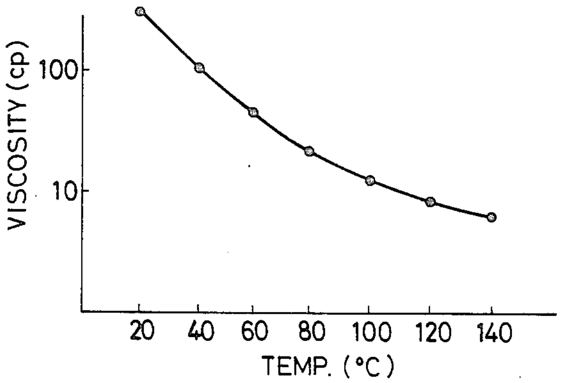
Figure 4C:
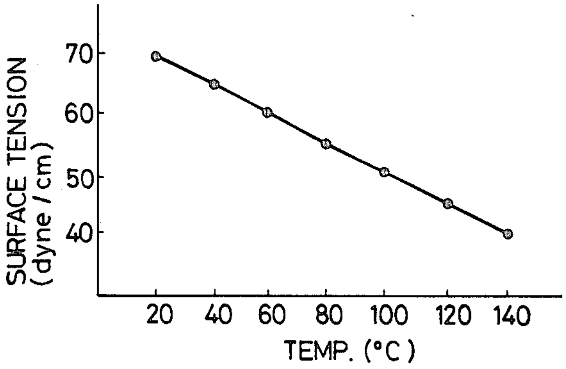
Figure 4D:
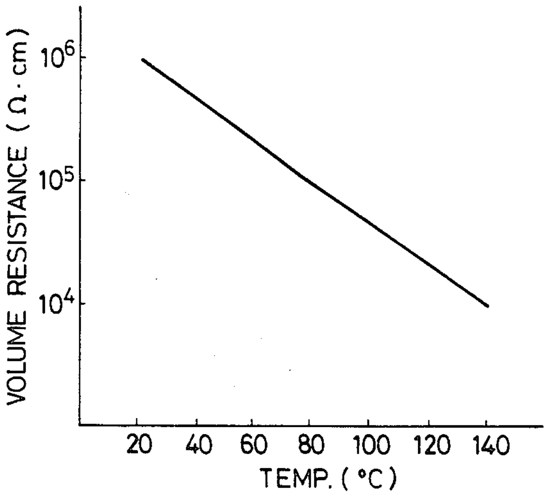

FIG. 4(A)–4(D) are graphs showing the results of experiments intended to find the threshold values. According to the data shown in FIG. 4(A), the higher the ink temperature, the lower the threshold electric field value becomes. As shown in FIG. 4(B), the viscosity of the ink decreases as the ink temperature rises. The same trend is observed in the cases of the surface tension (FIG. 4(C)) and specific volume resistance (FIG. 4(D)). As shown by the experiments, the aforesaid threshold electric field value is greatly influenced by the affect of temperature on the above factors.

In other words, the threshold electric field value decreases as the ink temperature rises, depending on the composite effect resulting from changes in physical properties including the viscosity, surface tension, and electrical conductivity of the ink.

Accordingly, at a level of the electric field at which the ink is not stimulated to jet at the room temperature, the ink will jet from locally heated areas because of the cooperative action of the heat and static electric field, so that picture element recording may be carried out.

Figure 5:
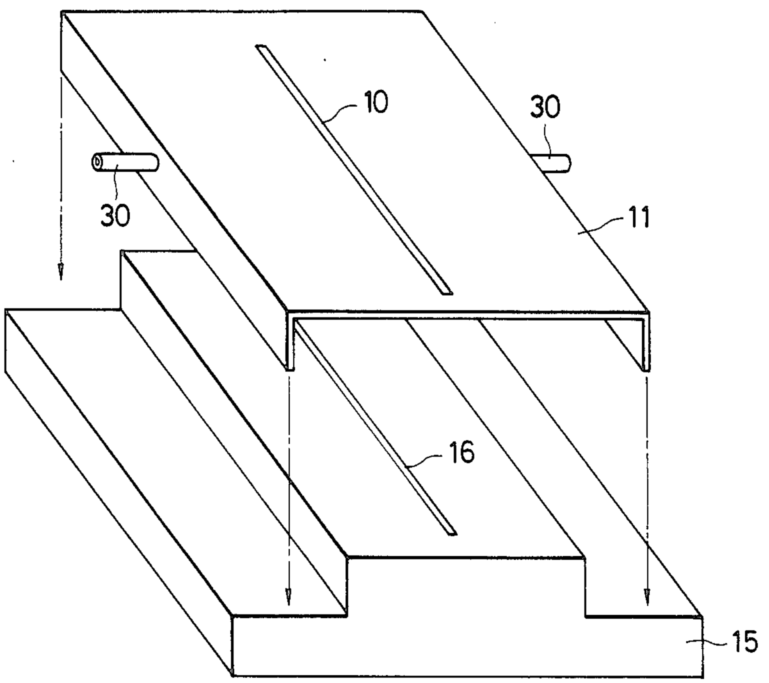
FIG. 5 is a perspective view showing a more specific embodiment of the present invention.

In FIG. 5, the heating resistor 16 illustrated in FIG. 1 and the lead electrodes (not shown) are formed on a base 15. The cover 11 placed thereon is in the form of an inverted channel and pipes 30 for supplying ink are letted to both sides thereof. Moreover, a discharge opening such as the slit 10, is provided in the surface of the cover 11 aligned with and above a heating resistor 16.

Figure 6:
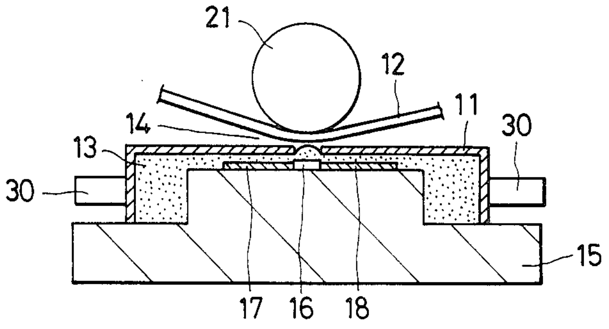
FIG. 6 is a sectional view of the recording head of the present invention in operation.

Referring to FIG. 6, the ink 13 is supplied to the image recording head by one of the pipes 30, flows over the electrodes 17, 18 and the resistor 16, across the discharge portion 14, and is discharged from the other pipe 30. The ink 13 is heated by selected heating resistors 16 near the discharge portion 14, and although the ink temperature gradually rises if it is kept flowing, it is not erroneously jetted. The ink may be selected to solidify when recording is stopped, but to flow again when recording is resumed. Furthermore, such construction is useful for preventing ink solidification.

The portion of the cover 11 adjacent the field forming electrode 19 should preferably be made of an electrically non-conductive material for example, a non-conductor, in view of the application of the electric field to the proximity of the discharge portion. The cover 11 should also preferably be formed of a rigid material so that the slit gap is free from distortion.

Figure 7:
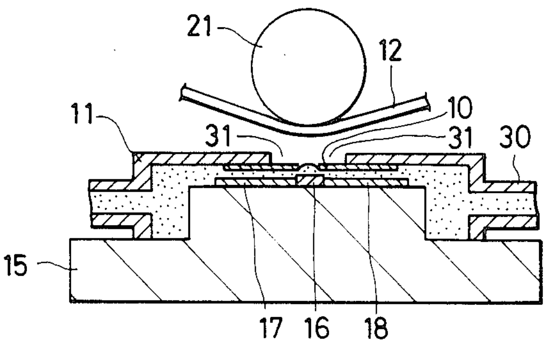
FIG. 7 is a sectional view showing a modified embodiment of the recording head of FIG. 6.
Figure 8:
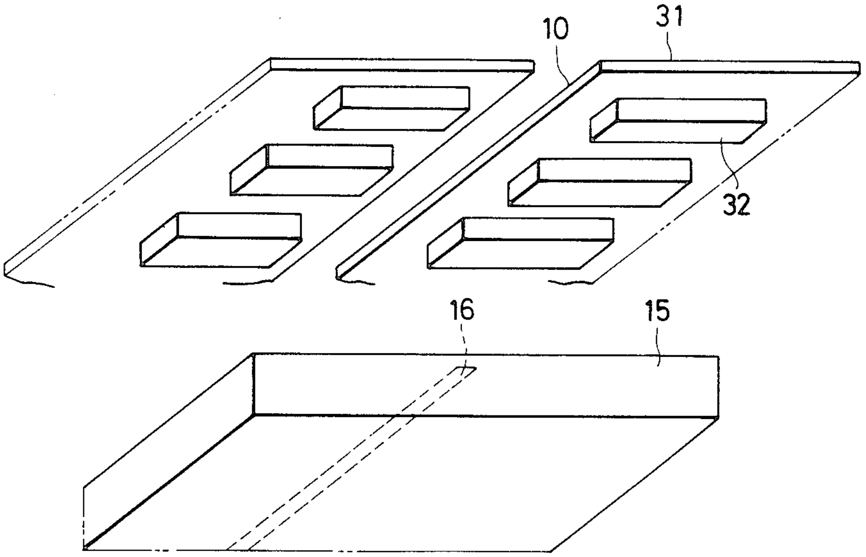
FIG. 8 is a perspective view of a recording head using the embodiment of FIG. 7.

If the thickness of the cover 11 is increased, the gap (FIG. 1) between the electric field forming electrode 19 and the opposite electrode 21 will be lengthened and the voltage to generate the predetermined electric field must also be increased. Therefore, it is preferred that the portion of the cover 11 adjacent the periphery of the slit 10 be formed with a thin panel 31 as shown in FIG. 7. In this case, the portion of the cover 11 located away from the slit 10 may be thicker, and may be formed of steel or the like for strength and rigidity. In addition, the thin panel 31 may be corrugated to add strength or, as shown in FIG. 8, reinforcing members 32 may be fitted thereto. This panel can be made of a high polymer resin or the like.

The image recording head of the present invention is capable of jetting the ink for high-speed and high-sensitivity recording at temperatures not exceeding that causing extreme thermal deterioration of the ink, the heating resistors and the like, with the electric field not being so intense as to cause leakage across the electrodes.

Moreover, the means for holding the ink is relatively simple in construction and needs no complicated precise mechanism. Also, comparatively small quantities of electric and thermal energies are sufficient, so that the driving circuit is made compact thereby.

Variations and modifications of the above-described embodiments of the invention, falling within the scope of the appended claims, will be apparent to those skilled in the art.

What is claimed is:

1. An image recording apparatus adapted to apply both electric and thermal energies to a liquid coloring agent to jet droplets of the liquid coloring agent toward a backing electrode adapted to support a recording medium comprising:

container means for containing said liquid coloring agent, said container means comprising a base member, a cover member above said base member and having at least one elongated thereon slit for discharging said liquid coloring agent from said container means, said base member having an upper face;

thermal energy applying means for selectively locally heating the liquid coloring agent, said thermal energy applying means comprising a plurality of heating elements arranged on the upper face of said base member, at least one of said heating elements being aligned in parallel with and centered under said slit, and lead electrodes adapted to supply current to said heating elements, and a heat resistant insulating layer being provided over said heating elements;

electric energy applying means for applying an electric field to said liquid coloring agent, said electric energy applying means comprising at least one electric field forming electrode positioned on said heat resistance insulating layer, said electric field forming electrode being aligned with and centered under said slit;

first power supply means for establishing a voltage drop between the electric field forming electrode and the backing electrode to produce an electric field having a level less than the level required to jet liquid coloring agent toward the backing electrode; and second power supply means for selectively energizing said heating elements to raise the temperature of the liquid coloring agent in the area of the energized heating elements to jet droplets of said liquid coloring agent under the influence of said electric field.

2. The image recording head of claim 1, wherein said cover member has a thicker portion and a thinner portion, said thinner portion being located around the periphery of said slit and being formed of an electrically non-conductive material.

3. The image recording head of claim 1, further comprising pipe means in said cover member for flowing said liquid coloring agent over said heating element and removing said liquid coloring agent from said containing means.

* * * * *